United States Patent [19]

Kendall et al.

[11] 4,099,620

[45] Jul. 11, 1978

[54] REJECTOR DRIVE SYSTEM FOR SORTING APPARATUS

[75] Inventors: Robert M. Kendall, Sunnyvale; William F. Lapson, Cupertino, both of Calif.

[73] Assignee: Acurex Corporation, Mountain View, Calif.

[21] Appl. No.: 780,313

[22] Filed: Mar. 23, 1977

[51] Int. Cl.[2] .............................................. B65G 47/34

[52] U.S. Cl. ........................... 209/74 R; 209/111.7 R

[58] Field of Search .................... 209/73, 74 R, 74 M, 209/111.5, 111.6, 111.7 R, 111.7 T, 111.8, 111.9

[56] References Cited

U.S. PATENT DOCUMENTS

| | | | |
|---|---|---|---|
| 3,467,254 | 9/1969 | Simmons | 209/111.6 |
| 3,722,676 | 3/1973 | Mathews | 209/111.5 |
| 3,990,581 | 11/1976 | Tengasater | 209/111.6 |

*Primary Examiner*—Allen N. Knowles

[57] ABSTRACT

An inspection apparatus scans the object being sorted and produces a reject signal for rejecting an unwanted object. In the sorting of produce culls (spoiled green or overripe produce) are rejected. The rejector system employs a piston-driven rejector for removing the culls or unwanted object. An air cylinder provides air under pressure to drive the piston. A valve selectively applies from the cylinder in response to the reject signals. A flow restrictor is placed in the air supply line for controlling the acceleration and velocity of the air-driven piston.

5 Claims, 4 Drawing Figures

REJECTOR DRIVE SYSTEM FOR SORTING APPARATUS

BACKGROUND OF THE INVENTION

This invention relates generally to a rejector drive system for sorting apparatus and more particularly to a system in which the acceleration-velocity characteristics of the rejector are controlled.

In agriculture, harvesters are employed to harvest the produce from the plants or vines and direct the produce into conveyor belts to present the produce to an inspection station where (damaged, spoiled, overripe, or underripe produce) are rejected. Recent developments have provided photoelectric scanning systems which scan the produce and generate reject signals for rejecting the culls. The reject signals are then employed to control a reject apparatus.

One type of such reject apparatus employs a bopper which hits the produce to be rejected and deflects the produce from the belt into a reject bin or onto the ground. The action of the bopper must be rapid to reject a cull and return to a ready position to strike the next following produce if it is also to be rejected. Generally the bopper is driven by an air cylinder to which air pressure is selectively applied responsive to the reject signal. Full pressure is applied to the air cylinder throughout the stroke so that it rapidly accelerates to bop or strike the produce and thereafter the air is applied to rapidly return the piston to its ready position. The piston is physically stopped at its extreme positions. This gives rise to high impact forces. The impact forces at the two extreme positions of the piston cause cracking at the pneumatic cylinders at various locations, breakage of fittings, loosening of parts, and cracking of supports.

Similar problems are encountered in sorting systems for sorting other objects or articles in which pistons are employed to reject unwanted objects or articles.

Various attempts have been made to cure the problem without success. For example, the cylinders are operated with the minimum pressure which will result in the required stroke lenght ad stroke time. This of course reduces the impact forces to a minimum which is controlled by the required stroke length and time. Other attempts to cure include the use of elastic mounts, less massive fittings, strain reliefs, control of the pressure pulse applied to the air cylinder. However, all such solutions have not been entirely satisfactory.

OBJECTS AND SUMMARY OF THE INVENTION

It is a general object of the present invention to provide an improved reject system for sorting apparatus.

It is another object of the present invention to provide a reject system in which the impact forces are minimized.

It is a further object of the present invention to provide a reject system employing an air cylinder in which the acceleration-velocity characteristics of the drive piston are controlled to minimize the impact forces.

The foregoing and other objects of the invention are achieved by reject system employing a bopper which is driven by an air cylinder including a drive piston and valve means selectively applying pressure to the cylinder to advance and retract the piston. The system is characterized in that a flow restrictor is provided in the air supply line whereby full pressure is initially applied to the piston to rapidly accelerate the piston and thereafter the velocity is limited principally by the flow through the flow restrictor to thereby control the acceleration-velocity characteristics of the piston.

DESCRIPTION OF PREFERRED EMBODIMENTS

Figure 1:
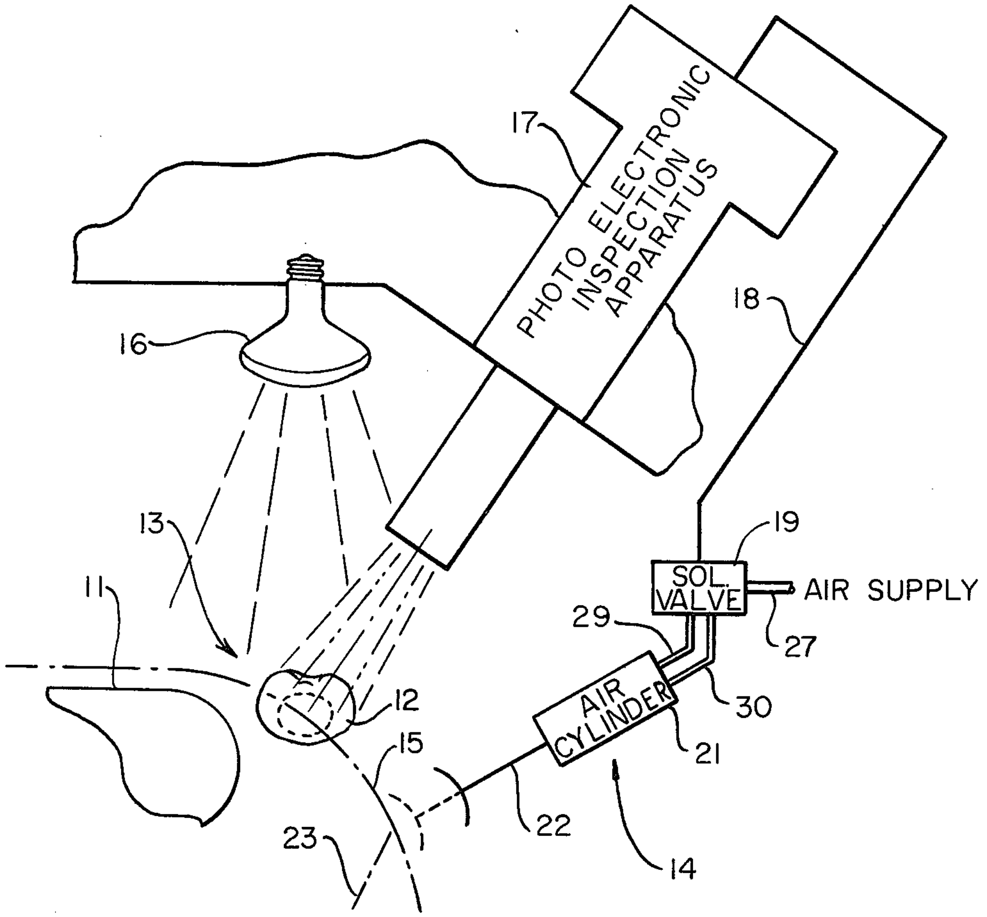
FIG. 1 is a schematic diagram showing a produce reject system incorporating the present invention.

Referring to FIG. 1, there is schematically shown a produce sorting system incorporating in accordance with the present invention. It will be apparent, however, that the present invention can be employed with other object or article sorting systems. As an example, the system shown is mounted on a tomato harvester. Only the transport belt for the tomato is shown. The tomato harvester is driven through the tomato fields, removes tomatoes from the vines and deposits them on one or more tomato transport belt 11. The belts transport the tomatoes 12 to a loading conveyor, not shown, which discharges tomatoes into trucks or the like drawn alongside the harvester. The automatic tomato sorters incorporating the present invention are positioned so that they intercept the flow of tomatoes on the collection belts. Normally the tomatoes are arranged in a multiplicity of parallel rows and the tomatoes are individually viewed at viewing region 13. If a tomato is determined to be a cull, a reject mechanism 14 is energized to remove the tomato from the belt and discharges the cull onto the ground. The remaining tomatoes continue in their normal course.

Referring more particularly to FIG. 1, there is illustrated a transport belt 11 which transports and presents the tomatoes 12 to the viewing area 13. A tomato 12 is shown in the viewing area. The trajectory of the tomato is indicated by the broken line 15. The tomato is illuminated by a suitable source of light 16 and reflections from the tomato are applied to a photoelectric inspection apparatus 17 which provides a reject signal along the line 18 when a cull is observed. The signal on the line 18 activates a solenoid valve 19 which controls the flow of air from associated air supply to the air cylinder 21. The air piston drives bopper 22 which strike the cull whereby the tomato is deflected from the trajectory 15 and falls along a line indicated generally by the line 23.

Figure 3:
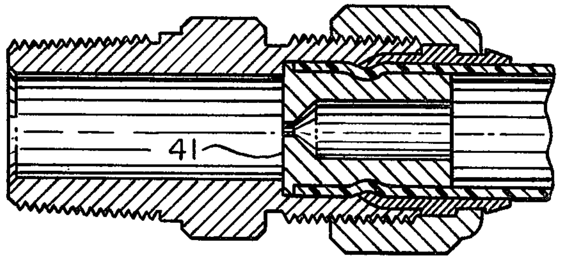
FIG. 3 is an enlarged sectional view showing the flow restrictor employed in the present invention.
Figure 2:
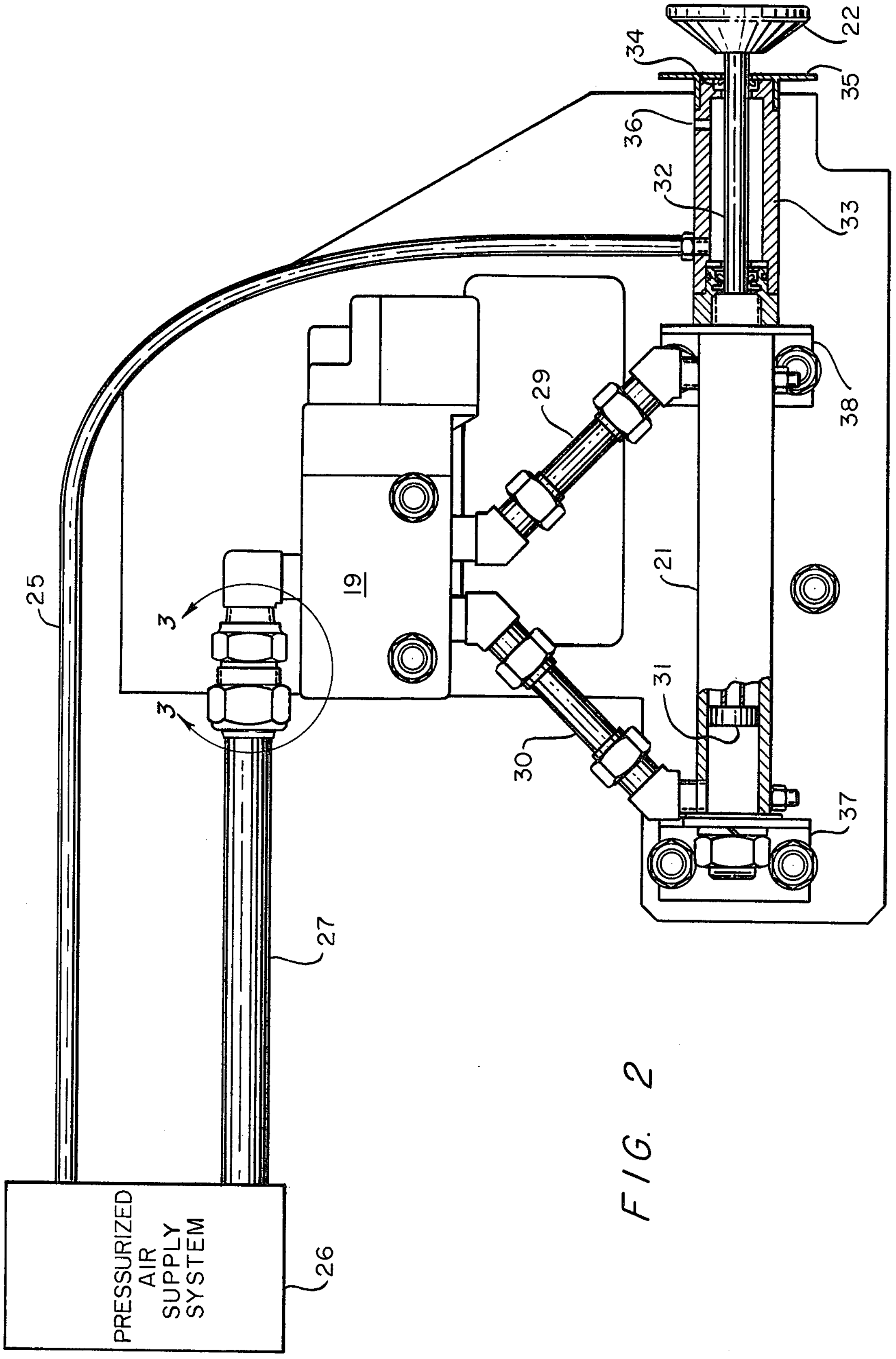
FIG. 2 is an elevational view partly broken away of a rejector system in accordance with the invention.

As explained above, the present invention is directed to the bopper or rejector drive system. The system is more clearly illustrated in FIGS. 2 and 3. The system includes a source or supply of pressurized air schematically illustrated by block 26. A cylinder air supply line 27 is shown connected to the air supply. A second air supply line 25 is also shown connected to the air supply. Air supply line 27 is connected to the solenoid valve 19. The valve controls the application of air to the lines 29 and 30 which serve to project the bopper 22 forward and retract the bopper respectively as the air pressure is selectively applied to the lines 29 and 30. The air cylinder 21 includes a piston 31 which is driven by the air to projected and retracted positions. The piston 31 is connected to a drive shaft 32 connected to the bopper 22.

Since the apparatus is subjected to dust, dirt and other field contaminants means are provided for sealing the air cylinder and its environment from the surrounds. Such means include a sealing assembly 33 including an O-ring 34 cooperating with the shaft 32. The shaft 32 is within a gland housing 35 and air is continually supplied along the line 25 to the housing whereby to cause any dirt or the like which flows past the gland 35 to be flushed out from the exhaust ports 36.

Figure 4:
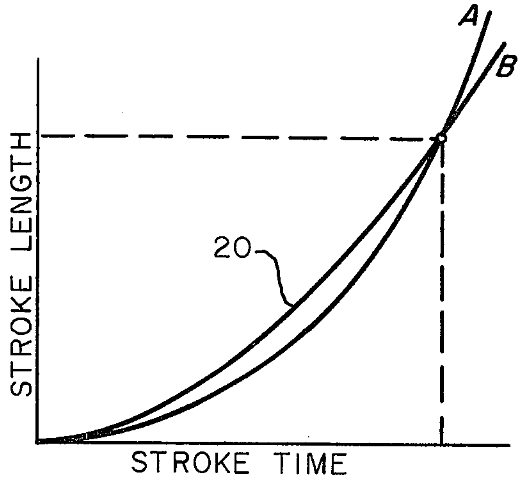
FIG. 4 are curves showing piston position as a function of time.

As previously explained and in accordance with the prior art, full pressure was continuous during the entire projection and retraction stroke of the motion whereby at the end of the stroke, high damaging impact forces resulted. In accordance with the present invention, there is provided a flow restrictor 41 in the supply line 27, FIG. 3. The action of the flow restrictor is to allow full pressure to be applied to the end of the cylinder and piston when the valve is initially opened. If the volume between the restrictor and the cylinder is small, full line pressure is developed at the piston surface while the piston is still close to its rest or retracted position. The piston accelerates rapidly and acquires a velocity which is limited by the air flow permitted by the restrictor. The flow restrictor operates on a similar manner during the retract cycle. FIG. 4 shows a curve of stroke position of the piston as a function of time with and without a flow restrictor. It is to be noted that with no flow restrictor in the supply line the piston continues to accelerate and the velocity is increasing at the end of the stroke as shown by curve A, whereas with a restrictor the acceleration is smooth and the velocity is lower and relatively constant at the end of the stroke curve 20. The time required is the same in both instances. The system shown and described has been used in the field with excellent results.

As described above the present invention can be applied to various sorting apparatuses in which an air activated rejector is employed. The system minimizes damage to the rejector by controlling the flow of fluid throughout the operating cycle.

What is claimed is:

1. A rejector system for sorting apparatus including a rejector for engaging and displacing objects to be rejected including an air cylinder having a piston for driving said rejector between an advanced and retracted position, means for supplying pressurized air to said cylinder for driving said piston to advance the rejector, control means connected between said air supply means and said cylinder for selectively applying air pressure to said cylinder to cause said piston to drive said rejector, and a flow restrictor disposed in said air supply to restrict the flow of air to said cylinder after the piston is initially accelerated to limit the velocity of the piston.

2. A rejector system as in claim 1 in which said flow restrictor comprises a portion of reduced cross-section in said supply system.

3. A rejector system as in claim 1 in which said rejector comprises a bopper for engaging and displacing objects to be rejected.

4. A rejector system as in claim 3 in which said objects comprise produce.

5. A rejector system as in claim 1 in which said control means comprises a valve to control application of air to said cylinder to selectively advance and retract the piston.

* * * * *